United States Patent
Weingarten et al.

(10) Patent No.: US 12,421,353 B2
(45) Date of Patent: Sep. 23, 2025

(54) POLYCONDENSATION PREPARATION OF POLYSILOXANES USING CONCURRENT ACID/BASE CATALYSTS

(71) Applicant: Dow Silicones Corporation, Midland, MI (US)

(72) Inventors: Ronen Weingarten, Midland, MI (US); Gary Wieber, Wayland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 18/994,264

(22) PCT Filed: Jun. 21, 2023

(86) PCT No.: PCT/US2023/025801
§ 371 (c)(1),
(2) Date: Jan. 14, 2025

(87) PCT Pub. No.: WO2024/019855
PCT Pub. Date: Jan. 25, 2024

(65) Prior Publication Data
US 2025/0263520 A1    Aug. 21, 2025

Related U.S. Application Data

(60) Provisional application No. 63/390,023, filed on Jul. 18, 2022.

(51) Int. Cl.
*C08G 77/08*    (2006.01)
*C08G 77/16*    (2006.01)

(52) U.S. Cl.
CPC ............. *C08G 77/08* (2013.01); *C08G 77/16* (2013.01)

(58) Field of Classification Search
CPC ...................................................... C08G 77/08
See application file for complete search history.

(56) References Cited

U.S. PATENT DOCUMENTS

| | | | |
|---|---|---|---|
| 6,391,999 B1 | 5/2002 | Crivello | |
| 7,595,372 B2 | 9/2009 | Lejeune et al. | |
| 7,732,552 B2 | 6/2010 | Lejeune et al. | |
| 7,985,821 B2 | 7/2011 | Lejeune et al. | |
| 2004/0109950 A1 | 6/2004 | Adams et al. | |
| 2014/0094532 A1 | 4/2014 | Knott et al. | |
| 2014/0242787 A1* | 8/2014 | Fujiwara | H01L 21/426 528/10 |

FOREIGN PATENT DOCUMENTS

| | | | | |
|---|---|---|---|---|
| CN | 103588972 | | 2/2014 | |
| CN | 106432732 | | 2/2017 | |
| CN | 107629210 | A * | 1/2018 | |
| EP | 3543304 | | 8/2020 | |
| JP | 2010070755 | A * | 4/2010 | |
| JP | 2021055049 | A * | 4/2021 | |
| KR | 1624370 | | 5/2016 | |
| WO | 2014186923 | | 11/2014 | |
| WO | WO-2019082803 | A1 * | 5/2019 | ............... C08K 9/00 |

OTHER PUBLICATIONS

Machine translation of CN 10769210 (no date).*
Machine translation of JP 2010-070755 (no date).*
Dare, "Modified procedure for improved synthesis of some octameric silsesquioxanes via hydrolytic polycondenzation in the presence of Amerlite ion-exchange resins", Dalton Transactions, 2006, pp. 3668-3671.
Higuchi, "Solid Acid and Base-Catalyzed Cyanosilylation of Carbonyl Compounds with Cyanotrimethylsilane", Bull. Chem. Soc. Japan, 1993, vol. 66, No. 7, pp. 2016-2032.

* cited by examiner

*Primary Examiner* — Marc S Zimmer
(74) *Attorney, Agent, or Firm* — Steven W. Mork

(57) ABSTRACT

A process for preparing polysiloxanes is a two-part polycondensation of alkoxy silanes and/or alkoxy siloxanes the process comprising the following steps: (a) hydrolysis of the alkoxy silanes and/or alkoxy siloxanes to hydroxyl-functional silanes and/or hydroxyl-functional siloxanes; and (b) condensation of the hydroxyl-functional silanes and/or hydroxyl-functional siloxanes to form polysiloxane polycondensation product; where the process is characterized by having both gel-type heterogeneous acid catalysts and gel-type heterogeneous base catalysts present concurrently during both the hydrolysis and condensation steps.

10 Claims, No Drawings

POLYCONDENSATION PREPARATION OF POLYSILOXANES USING CONCURRENT ACID/BASE CATALYSTS

FIELD OF THE INVENTION

The present invention relates to a method for preparing polysiloxanes by a polycondensation reaction involving hydrolysis and condensation reactions that occur with concurrent presence of gel-type heterogeneous acid and base catalysts.

INTRODUCTION

One route to preparing polysiloxanes is through a two-step polycondensation reaction of alkoxy silanes and/or alkoxy siloxanes. The first step requires hydrolysis of alkoxy silanes and/or alkoxy siloxanes to form hydroxy-functional silanes and/or siloxanes. The second step requires polycondensation of the hydroxy-functional silanes and/or siloxanes. Acid and base catalysts are useful for accelerating the rate of reaction in the two steps of the polycondensation reaction. The reaction process typically requires using an acid catalyst for the hydrolysis step and a base catalyst for the polycondensation step.

The catalysts can be "homogeneous" catalysts, which means that the catalyst forms a homogeneous solution with a reaction solution. Alternatively, the catalysts can be "heterogeneous" catalysts, which means they are insoluble in the reaction solution and remain a separate phase from the reactants in a reaction solution. Homogeneous catalysts are often desirable because they more readily achieve intimate contact with reactants in a reaction mixture than heterogenous catalysts and therefore tend to achieve faster reaction rates. Heterogeneous catalysts, however, have a desirable character of being easier to separate from a reaction solution after the reaction is over than homogeneous catalysts. Removing homogeneous catalyst often requires neutralization to form undesirable salts. Separation of heterogenous catalysts can be accomplished by, for example, decanting or filtration.

Acid and base catalysts are not used concurrently because they tend to react with one another thereby mutually destroying their catalytic functionality (neutralization). Therefore, a two-step polycondensation reaction can involve multiple steps including running the hydrolysis reaction with an acid catalyst, neutralizing the acid catalyst to remove it from the hydrolysis reaction mixture, adding a base catalyst for the condensation reaction, and then neutralizing and removing the base catalyst from the polycondensation reaction products.

It is desirable to identify a way to prepare polysiloxanes starting with alkoxy silanes and/or alkoxy siloxanes by polycondensation using a process that benefits from the fast reaction rates of homogeneous catalysis systems but uses heterogeneous catalysts to benefit from ease and efficiency of isolation of the catalysts when the reactions are completed. Moreover, it would be desirable to identify such a method that would allow for concurrent presence of both acid and base catalysts through both the hydrolysis and condensation reactions without requiring removal of one catalyst after the hydrolysis reaction and addition of another for the condensation reaction. Use of concurrent catalysts would simplify the two-step polycondensation reaction procedure.

BRIEF SUMMARY OF THE INVENTION

The present invention provides a solution to discovering a way to prepare polysiloxanes starting with alkoxy silanes and/or alkoxy siloxanes by polycondensation using a process that benefits from the fast reaction rates of homogeneous catalysis systems but uses heterogeneous catalysts to benefit from ease and efficiency of isolation of the catalysts when the reactions are completed. Moreover, the present invention allows for concurrent presence of both acid and base catalysts through both the hydrolysis and condensation reactions without requiring removal of one catalyst after the hydrolysis reaction and addition of another for the condensation reaction. Yet even more, with the present invention it is possible to use acid and base catalysts concurrently without resulting in material inhibition of the catalytic properties of the acid and base catalysts.

The present invention is a result of discovering that gel-type heterogeneous acid and gel-type heterogeneous base catalysts, such as are typically used as ion exchange resins, can exist in a polycondensation reaction solution together without neutralizing their acid and base functional groups and can also effectively catalyze the polycondensation of alkoxy silanes and/or alkoxy siloxanes through hydrolysis and condensation at a rate at least as fast as using a two-step homogeneous catalyst process.

Gel-type heterogeneous catalysts have surprisingly been found to uniquely achieve these results as concurrently present acid and base catalysts in a polycondensation reaction of alkoxy silanes and/or alkoxy siloxanes. Macroporous heterogeneous ion exchange resins, for instance, do not have the same effect, as shown in the Examples section herein below. Even more surprising, sequential addition of gel-type heterogeneous catalysts did not perform as well (took longer and reaction was less complete) as the sequential homogeneous catalyzed reaction or the concurrent use of gel-type heterogeneous acid and base catalysts. Therefore, concurrent presence of the heterogeneous gel-type heterogeneous acid and base catalysts during hydrolysis and condensation of alkoxy silanes and/or alkoxy siloxanes results in synergistic performance of the overall polycondensation reaction.

In a first aspect, the present invention is a process for preparing polysiloxanes, where the process comprises a two-part polycondensation of alkoxy silanes and/or alkoxy siloxanes the process comprising the following steps: (a) hydrolysis of the alkoxy silanes and/or alkoxy siloxanes to hydroxyl-functional silanes and/or hydroxyl-functional siloxanes; and (b) condensation of the hydroxyl-functional silanes and/or hydroxyl-functional siloxanes to form polysiloxane polycondensation product; where the process is characterized by having both gel-type heterogeneous acid catalysts and gel-type heterogeneous base catalysts present concurrently during both the hydrolysis and condensation steps.

In a second aspect, the present invention is a composition comprising at the same time: (a) reactants selected from alkoxy silanes and/or alkoxy siloxanes, and/or siloxane polycondensation reaction products of alkoxy silanes and/or alkoxy siloxanes; (b) a gel-type heterogeneous acid catalyst; (c) a gel-type heterogeneous base catalyst; and (d) water.

The present invention is useful for preparing polysiloxanes from alkoxy silanes and/or alkoxy siloxanes.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; and ISO refers to International Organization for Standards.

"Multiple" means two or more. "And/or" means "and, or as an alternative". All ranges include endpoints unless otherwise indicated. Identification of materials by trademark or tradename refers to materials having the composition as sold under that trademark or tradename at the priority date of this document.

The general terms "$C_{x-y}$", "$C_x$-$C_y$" and "Cx-Cy" are interchangeable in the context of chemical structures and refers to having from x to y carbon atoms in the chemical structure.

"Heterogeneous catalyst" refers to a catalyst that is insoluble and therefore remains in particulate form in a reaction mixture for which it serves as a catalyst.

"Homogeneous catalyst" refers to a catalyst that is soluble in a reaction mixture.

"Gel-type resin" refers to resins in particle form that, especially in a non-solvent swollen state, is free of pore structures having a pore size greater than penetrating through the surface and extending through the resin particle, where the pore structure has a pore size greater than 2 Ångstroms, typically greater than one Ångstrom, and can be free of pore structure having a pore size greater than 0.5 Ångstroms and can be free of any pore structure penetrating through the surface and extending through the resin particle. Gel-type resins swell (change volume) appreciably in polar solvents upon imbibing the polar solvent and typically become translucent when solvent swollen. Gel-type resins are also known in the ion-exchange art as microporous resins.

"Gel-type heterogeneous catalyst" refers to a gel-type resin typically in particle form that acts as a heterogeneous catalyst. A "gel-type heterogenous acid catalyst" is a gel-type resin with acid chemical functionality that acts as a heterogeneous acid catalyst. A "gel-type heterogenous base catalyst" is a gel-type resin with basic chemical functionality that acts as a heterogeneous base catalyst.

"Macro-porous resins", also known as macroreticular resins, refers to resins in particle form having a well-defined pore structure extending through the surface and throughout the resin that typically have a pore size greater than 2 Ångstroms, typically greater than 50 Ångstroms, and even more typically greater than 100 Ångstroms and that is present regardless of the presence of solvent. Macro-porous resins typically have a crosslink density higher than gel-type resins and as a result do not swell appreciably, and may not swell at all, in the presence of a polar solvent.

"Macroporous-type heterogeneous catalyst" refers to a macroporous-type resin that acts as a heterogeneous catalyst. A "macroporous-type heterogenous acid catalyst" is a macroporous-type resin with acid chemical functionality that acts as a heterogeneous acid catalyst. A "macroporous-type heterogenous base catalyst" is a macroporous-type resin with basic chemical functionality that acts as a heterogeneous base catalyst.

"Silane" includes organosilane of the general formula: $R_aSiY_{(4-a)}$ where $R_a$ is hydrogen, alkyl, substituted alkyl, arylalkyl, substituted arylalkyl, aryl and substituted aryl. The alkyl groups and substituted alkyl groups each independently typically contain one or more, 2 or more, 3 or more, 4 or more, 5 or more, 6 or more, even 7 or more while at the same time typically contain 8 or fewer and can contain 7 or fewer, 6 or fewer, 5 or fewer, 4 or fewer, 3 or fewer, even 2 or fewer carbon atoms. At least one Y is an alkoxyl for "alkoxy functional silane" and at least one Y is hydroxyl for "hydroxyl-functional silane".

"Siloxane" refers to molecules comprising at least one siloxane (Si—O—Si) bond. Herein, "siloxane" can be a "polysiloxane" having multiple siloxane bonds or a siloxane having only one siloxane bond. The term "polysiloxane" is used when meaning a siloxane having more than one siloxane bond. Polysiloxanes can have chain, ring, ladder and three-dimensional network structures.

Polysiloxanes comprise multiple siloxane units linked together through siloxane bonds. Siloxane units can be characterized by the designation M, D, T or Q. M refers to a siloxane unit having the formula "$(CH_3)_3SiO_{1/2}$". D refers to a siloxane unit having the formula "$(CH_3)_2SiO_{2/2}$". T refers to a siloxane unit having the formula "$(CH_3)SiO_{3/2}$". Q refers to a siloxane unit having the formula "$SiO_{4/2}$". Non-oxygen groups bound to the silicon atom in M, D and T units are methyl groups unless otherwise stated or indicated. Notably, an oxygen atom having a multiple of "½" subscript indicates that the oxygen bridges the specified atom to a second atom where the second atom is also specified with an oxygen having a multiple of "½" subscript so as to form a siloxane bond. For example, $((CH_3)_3SiO_{1/2})(SiO_{4/2})$, or MQ, refers to a M unit bound to a Q unit with an oxygen atom shared between the silicon atom of the M unit and a silicon atom o the Q unit. The multiplier of the ½ subscript indicates how many oxygen atoms are in such a shared bonding configuration with the silicon atom of the siloxane unit.

Reference to a siloxane unit designation with the suffix "-type" refers to the siloxane unit where any one or more than one methyl group is actually an R group where R is a group other than methyl such as hydroxyl, alkoxyl, or hydrocarbyl. The hydrocarbyl typically contains from one to 8 carbon atoms. For instance, R can be methyl, ethyl, propyl, butyl, pentyl, hexyl, heptyl, or octyl.

A siloxane unit can include as a superscript an indication of a group bound to that silicon atom in place of an alkyl group. For instance, "$M^H$-type" unit refers to an M-type unit with one R group replaced with hydrogen: $((R^1)_2HSiO_{1/2})$. "$M^H$" unit refers to an M unit with one methyl replaced with a hydrogen atom $((CH_3)_2HSiO_{1/2})$. $T^{Ph}$ unit refers to a T unit with the methyl replaced with a phenyl group.

Chemical formula designations for polysiloxanes using M, D, T, Q abbreviations typically have subscripts associated with the unit designator that can either refer to the average mole ratio of that siloxane unit relative to all siloxane units in the molecule or the average number of the associate siloxane units in the molecule. When the subscript associated with a siloxane unit is greater than or equal to one, then the subscript refers to the average number of those siloxane units in the molecule. When the subscript associated with a siloxane unit is less than one then the subscript refers to the average mole ratio of that siloxane unit relative to the number of moles of all siloxane units in the molecule. An absence of a subscript implies a subscript value of one.

"OZ" sites refer to a combination of hydroxyl and alkoxyl groups bound to silicon atoms. The total number of OZ sites on a molecule or reaction mixture refers to the total number of the combination of hydroxyl and alkoxyl groups bound to silicon atoms in the molecule or present in the reaction mixture. OZ content for a material is reported as a mole-percent (mol %) relative to moles of silicon atoms in the molecule.

The process of the present invention comprises a two-part polycondensation of alkoxy silanes and/or alkoxy siloxanes.

The alkoxy silanes have the general structure $(RO)_xR'_{(4-x)}Si$; where subscript x has an average value of one or more, 2 or more even 3 or more while at the same time 4 or less, 3 or less, or even 2 or less, each R and R' is independently in each occurrence selected form a group consisting of C1-C8 alkyl groups (such as methyl, ethyl, propyl, butyl, pentyl, hexyl, heptyl and octyl groups), substituted C1-C8 alkyl groups, aryl groups and substituted aryl groups The alkoxy siloxanes can have one or more siloxane bond and include one or more than one alkoxyl group attached to at least one silicon atom. The alkoxyl group is as described for the (RO) group of the alkoxy silane. The alkoxy siloxane can be linear, branched, resinous, or any other structure possible with polysiloxanes.

"Two-part" polycondensation means the process involves two reactions to achieve a polycondensation: a hydrolysis reaction and a condensation reaction. The hydrolysis reaction and condensation reaction can occur sequentially or concomitantly. Typically, the alkoxy silane/siloxane undergoes hydrolysis to form a hydroxyl-functional silane or hydroxyl-functional siloxane, respectively. The hydroxyl-functional silanes and/or siloxanes then undergo condensation to form a polysiloxane. The polysiloxane is a polycondensation product of the two-part polycondensation.

The process of the present invention is characterized by having both gel-type heterogeneous acid catalysts and gel-type heterogeneous base catalysts present concurrently during both the hydrolysis and condensation steps. The process typically involves adding both gel-type heterogeneous acid catalysts and gel-type heterogeneous base catalysts to a reaction mixture comprising the alkoxy silanes and/or alkoxy siloxanes prior to the hydrolysis reaction step and keeping the catalysts there through the condensation reaction step. Preferably, the gel-type heterogeneous acid catalysts and gel-type heterogeneous base catalysts are blended together prior to adding to the reaction mixture for the hydrolysis reaction and maintained in the reaction mixture through the condensation reaction.

Surprisingly, the combination of gel-type heterogeneous acid catalysts and gel-type heterogeneous base catalysts catalyze the hydrolysis and condensation reactions and do so to a greater extent than if only the gel-type heterogeneous acid catalyst was used for hydrolysis and the gel-type heterogeneous base catalyst was added for the condensation reaction. The combination of gel-type heterogeneous acid catalysts and gel-type heterogeneous base catalysts also result in at least as extensive of a polymerization to form polycondensation product as the more typical sequential use of homogeneous acid catalyst followed by homogeneous base catalysts as is evidenced in the Experimental section by reacting more "OZ" sites in the reaction mixture and achieving a higher molecular weight and viscosity polycondensation product under the same reaction conditions for the same amount of time. The extent of the polycondensation reaction of the present invention further suggests that surprisingly the combination of gel-type heterogeneous acid catalysts and gel-type heterogeneous base catalysts exist without neutralizing the acid and base groups on the respective catalysts.

The gel-type heterogeneous acid catalysts and gel-type heterogeneous base catalysts are desirably solvent swollen when used in the present process. Solvent swollen means their volume has increased from imbibing solvent. Typically, the solvent is a polar solvent such as water or preferably an alcohol (for example, ethanol). Solvent swollen gels serve as more efficient catalysts than non-swollen gels because reactants can penetrate solvent swollen gels more readily than non-swollen gels. It is helpful for reactants to penetrate the gels so as to be exposed to more acid or base functional sites on the gel. Hence, swelling the gel-type heterogeneous catalyst with a solvent renders more of the catalytic acid and base sites available to reactants than if the gel-type catalyst was not swollen. In contrast, microporous-type resin catalysts have defined pores to allow reactant penetration without being solvent swollen.

The reaction mixture for the hydrolysis typically comprises water in addition to the alkoxy silanes and/or alkoxy siloxanes and heterogeneous catalysts described herein above. Additional solvent or solvents are desirably present, but are not required. Additional solvent can be selected, for instance, from polar solvents including alcohols (such as ethanol). The additional solvents are desirably present through both the hydrolysis and condensation reactions.

The process can be a batch-type process, continuous-type process, or a semi-continuous process. In a batch process, all of the reactants reside in a single reaction vessel from start to end of the reaction and the reaction mixture is typically stirred (or otherwise agitated) to maintain a suspension (slurry) of heterogeneous catalyst throughout the hydrolysis and condensation reactions to maximize efficient contact with the catalyst particles. In a continuous-type process reactants flow continuously through a reactor or multiple reactors as they react to form product, which then continuously flows from reactor. A semi-continuous process can take many different forms but involves batch-like aspects as well as continuous-like aspects. For instance. One semi-continuous process involves a series of batch reactors where reactants reside in one reactor for a period of time before flowing into another reactor for a period of time.

An example of a continuous-type process is a fixed bed column process. For example, a reaction mixture comprising alkoxy silanes and/or alkoxy siloxanes, water, and optionally solvent can flow through a column containing a physical mixture of gel-type heterogeneous acid catalysts and gel-type heterogeneous base catalysts as a stationary phase. The hydrolysis and condensation reactions then occur as the reaction mixture flows through column and contacts the heterogenous catalysts.

Desirably, the process of the present invention comprises heating the reaction mixture during hydrolysis, condensation, or both hydrolysis and condensation. During the reactions of the present process, it is typically desirable to have a reaction mixture temperature of 30 degrees Celsius (° C.) or higher, 40° C. or higher, 50° C. or higher, 60° C. or higher, 70° C. or higher, or even 80° C. or higher, while at the same time is typically heated to a temperature of 120° C. or lower, 110° C. or lower, 100° C. or lower, 90° C. or lower, even 80° C. or lower. Heating can occur by applying a heat source to the reaction mixture. Alternatively, some reactions such as hydrolysis reaction can be exothermic and heat the reaction mixture without separately applied heat. In fact, in some situations it is desirable to regulate the temperature increase resulting from an exothermic reaction by cooling or moderating the temperature of the reaction mixture in some way (such as by metering in water) to keep the temperature in a desirable range.

One desirable way to conduct the process is by utilizing a cofeed/costrip procedure during the hydrolysis. A cofeed/costrip procedure can be part of a batch, semi-continuous, or even a continuous process but is typically a feature for batch or semi-continuous processes using a single reaction vessel. A by-product of the hydrolysis reaction is alcohol, which occupies reactor volume and may inhibit hydrolysis reaction kinetics. In a cofeed/costrip procedure, heat the hydrolysis reaction mixture of catalyst and reactant(s) in a reaction vessel sufficiently to volatilize the alcohol products and remove the volatilized alcohol during the reaction by condensing it in a collection vessel. Typically, one or more reactant is feed into the reaction vessel while alcohol is volatilized and removed (stripped from the reaction vessel), hence the term "cofeed/costrip". Removal of alcohol and addition of reactant(s) can independently be continuous or intermittent and primarily occurs during hydrolysis when alcohol is forming. Addition of reactants can stop once the reaction vessel contains a desired volume. Once the alcohol has been stripped to a desired level the stripping procedure (volatilizing and removing alcohol) can stop. After the reactant feed and alcohol stripping stops the reactants can simply proceed for a desired time to complete the condensation reaction, typically while refluxing. Addition of additional catalyst can occur after stopping the alcohol stripping if desired. For instance, the reaction vessel can contain only the catalyst for hydrolysis during the cofeed/costrip procedure and then the condensation catalyst can be added when stripping of alcohol ceases. Of course, both hydrolysis and condensation catalysts can alternatively be present in the reaction vessel throughout hydrolysis and condensation reactions. The cofeed/costrip process can use homogeneous catalyst, heterogeneous catalyst, or a combination of both homogeneous and heterogeneous catalyst.

Removal of alcohol in the cofeed/costrip procedure frees up reaction vessel volume. The free reaction vessel volume allows for addition of more reactants to the reaction vessel than can be added if the alcohol remained, and that means more product can be produced in a single reaction vessel than if the alcohol was allowed to remain. That is a key benefit of the cofeed/costrip procedure—it can allow production of more polycondensation product in a given reaction vessel than a similar batch process that does not include stripping off the alcohol.

A desirable feature of the present inventive process is that the catalyst is easily isolated from the reaction mixture and/or reaction products. In a continuous flow process where the reaction mixture flows past stationary catalysts, the extrudate from the process is already free of catalyst and contains reaction products. In a batch process, the gel-type heterogeneous acid catalysts and gel-type heterogeneous base catalysts are readily isolated from the reaction mixture and/or products by, for example, allowing the heterogeneous catalysts to phase separate from solution (settle) and either decanting off the supernatant solution containing reactants and/or products or draining off the catalysts from the supernatant such as in a separation funnel. Gel-type heterogeneous acid catalysts and gel-type heterogeneous base catalysts can alternatively be isolated using filtration. Once isolated, the gel-type heterogeneous acid catalysts and gel-type heterogeneous base catalysts desirably can be used again in the process of the present invention typically without having to replenish acid and base functional sites on the catalysts. Isolated catalyst can be rinsed to remove undesirable components prior to subsequent use.

One example of a batch process of the present invention comprises the following steps:

First, provide a reaction mixture comprising: (i) a solvent-swollen blend of gel-type heterogeneous acid catalysts and gel-type heterogeneous base catalysts as a catalyst blend; (ii) a silane having the general formula: $(RO)_xR'_{(4-x)}Si$; where x has an average value of one or more, 2 or more, even 3 or more while at the same time 4 or less, 3 or less, or even 2 or less; each R and R' is independently in each occurrence selected form a group consisting of alkyl groups, substituted alkyl groups, aryl groups and substituted aryl groups; and (iii) water. The alkyl groups and substituted alkyl groups independently typically contain one or more, 2 or more, 3 or more, 4 or more, 5 or more, 6 or more, even 7 or more while at the same time typically contain 12 or fewer, 10 or fewer, 8 or fewer and can contain 7 or fewer, 6 or fewer, 5 or fewer, 4 or fewer, 3 or fewer, even 2 or fewer carbon atoms. The reaction mixture can comprise a solvent such as an alcohol (for example, ethanol) with other liquid components as a continuous phase. The components can be combined in any order to form the reaction mixture. Some components can be metered in during while the reactants react. For instance, water is typically metered in during hydrolysis rather than added all at once in order to help regulate the reaction mixture temperature and to prevent uncontrolled polymerization that results in gelling.

Second, agitate (for example, stir) the reaction mixture while optionally heating the reaction mixture to establish and maintain a slurry of components. Agitation can begin while combining the components of the reaction mixture in the first step or begin after combining all of the components of the reaction mixture. Desirably, agitation continues while allowing hydrolysis and condensation reactions to occur in the mixture to form a product mixture. Desirably, continue agitation throughout the process until both hydrolysis and condensation reactions have advanced to a desired extent.

Third, isolate the gel-type heterogeneous acid catalysts and gel-type heterogeneous base catalysts from the rest of the contents of the product mixture. In the broadest scope of this example, there is no limit on how to isolate the gel-type heterogeneous acid catalysts and gel-type heterogeneous base catalysts from the rest of the contents. Examples of how to isolate the catalysts include those methods as described hereinabove.

Optionally, the gel-type heterogeneous acid catalysts and gel-type heterogeneous base catalysts can be recycled and used again in another reaction process of the present invention.

A characteristic feature of the present invention is the presence of both gel-type heterogeneous acid catalysts and gel-type heterogeneous base catalysts throughout the reaction process. Typically, the combination of acid and base catalysts during a reaction is avoided because they tend to react with one another thereby neutralizing catalytic acid and base functionalities. However, the present invention is partly due to discovering that gel-type heterogeneous acid catalysts and gel-type heterogeneous base catalysts can be combined without neutralizing the catalytic acid and base functional, respectively, at least to an extent sufficient to materially inhibit their catalytic capability in the claimed process. In view of this discovery, the present invention further includes a composition comprising at the same time:
  (a) a gel-type heterogeneous acid catalyst and a gel-type heterogeneous base catalyst;
  (b) water;
  (c) reactants selected from alkoxy silanes and/or alkoxy siloxanes; and
  (d) optionally, a solvent such as a polar solvent such as ethanol.

In addition to, or as an alternative to, reactants selected from alkoxy silanes and/or alkoxy siloxanes the composition can comprise siloxane polycondensation reaction products of alkoxy silanes and/or alkoxy siloxanes.

EXAMPLES

Table 1 identifies the materials for use in the following Examples (Exs) and Comparative Examples (Comp Exs).

Swell the Gel-Type Heterogeneous Catalysts in Solvent 2 prior to use. Notably, use of Solvent 1 and Solvent 2 are expected to be interchangeable in the process and procedures described herein below while producing similar results.

TABLE 1

| Material | Description | Source |
| --- | --- | --- |
| Alkoxy silane | N-octyltriethoxysilane | Available as SIO6715.0 from Gelest. |
| Solvent 1 | Ethanol, denatured SDA 2B-5 | Sigma-Aldrich |
| Solvent 2 | Ethanol, 200 proof | Sigma-Aldrich |
| Water | Deionized water | Sigma-Aldrich |
| HCl Homogeneous Acid Catalyst | Hydrochloric Acid (10%) | Sigma-Aldrich |
| Homogeneous Base Catalyst KOH | Potassium hydroxide (45%) | Sigma-Aldrich |
| CaCO3 Neutralizing Agent | Calcium Carbonate | Sigma-Aldrich |
| Gel-type Heterogeneous Acid Catalyst BD20 | Gel-type sulfonic acid-functionalized cation exchange resin. | Available under the name AMBERLYST ™ BD20 from DUPONT ™.** |
| Macroporous-type Heterogeneous Acid Catalyst 17D | Macroporous-type sulfonic acid-functionalized cation exchange resin, Average pore diameter 200 Ångstoms, 30 square meters per gram surface area. | Available under the name AMBERLYST 17DRY from DUPONT. |
| Gel-type Heterogeneous Base Catalyst 550A | Gel-type quaternary ammonium-functionalized anion exchange resin in OH form. | Available under the name AMBERTEC ™ UP550 OH from DUPONT. |
| Macroporous-type Heterogeneous Base Catalyst A26 | Macroporous-type quaternary ammonium-functionalized anion exchange resin in OH form. | Available under the name AMBERLYST ™ A26, OH-form from Sigma-Aldrich. |
| Gel-type Heterogeneous Acid/Base Blend Catalyst | Gel-type sulfonic acid-functionalized and quaternary ammonium functionalized ion exchange resin physically mixed together (H+ and OH form). | Available under the name AMBERLITE ™ IRN 150 H/OH from DUPONT. |

AMBERLYST, AMBERTEC and AMBERLITE are trademarks of DDP Specialty Electronic Materials. DUPONT is a trademark of DUPONT Polymers, Inc.
**Similar results are expected by directly replacing the AMBERLYST BD20 material with material available under the name AMBERLYST 125 or AMBERLYST 131 from DUPONT Prepare Exs and Comp Exs according to the following procedures. Characterize the resulting products accordingly for viscosity, weight-average molecular weight (Mw), and total OZ content using the procedures that follow the Ex and Comp Ex procedures. Table 2 provides a general overview of the compositions reporting component amounts in grams (g) for each sample and product characterization for each Ex and Comp Ex.

Comp Ex A—Sequential Acid then Base Homogeneous Catalysts

Add into a batch kettle reactor the following components to form a reaction mixture: 190.88 grams (g) of n-octyltriethoxysilane, 12.00 g Solvent 1, 0.65 g HCL Homogeneous Acid Catalyst, and then feed in 14.18 g of Water (fed in at a rate of 0.178 milliliters per minute) while mixing at 600 revolutions per minute (RPM) for 80 minutes at 25° C. under a nitrogen blanket atmosphere. During this time, hydrolysis and condensation reactions occur thereby producing ethanol as a byproduct. Upon completion of water addition, heat the reaction mixture to 77° C. and reflux for 2 hours. Cool the reaction mixture down to 25° C. and add 0.65 g Homogeneous Base Catalyst KOH to neutralize the HCL Homogeneous Acid Catalyst and render the mixture basic. Heat the reaction mixture to 77° C. to reflux for another 2 hours during which time the reaction product undergoes "bodying" and increases in molecular weight. Cool the solution to 25° C. and add 1.4 g HCL Homogeneous Acid Catalyst to neutralize the base. Add 0.40 g CaCO3 Neutralizing Agent to neutralize the acid. At this point, two phases appear in the solution which are separated using a separatory funnel. The top phase contains ethanol and the bottom phase contains silicone resin product (siloxane product). Load the bottom phase back into the reactor and heat to 95° C. to strip any residual ethanol under atmospheric conditions. Heat the solution up to 130° C. with nitrogen sparging to complete solvent stripping. Use a Dean-Stark trap to collect residual solvent. Allow the resulting resin to cool down and characterize viscosity, weight-average molecular weight and OZ content as Comp Ex A.

Comp Ex B—Concurrent Macroporous Heterogeneous Acid and Base Catalysts

Prepare a catalyst pre-mixture by combining 17.64 g of Macroporous-type Heterogeneous Acid Catalyst 17D and 19.73 g Macroporous-type Heterogeneous Base Catalyst A26.

Add into a batch kettle reactor the following components to form a reaction mixture: 190.58 grams (g) of n-octyltriethoxysilane, 11.71 g Solvent 1, and the catalyst pre-mixture. Dose in 0.57 g of Water and then feed in 14.18 g of Water (fed in at a rate of 0.178 milliliters per minute) while mixing at 1000 RPM for 80 minutes at 25° C. under a nitrogen blanket atmosphere. During this time, hydrolysis and condensation reactions occur thereby producing ethanol as a byproduct. Upon completion of water addition, heat the reaction mixture to 77° C. and reflux for 4 hours. During this time, does in 0.37 g Water. Cool the reaction mixture down to 25° C. to obtain a cloudy mixture. Vacuum filter the reaction mixture using a Büchner funnel with Fisher Scientific P4 filter paper to remove the solid acid and base catalysts. Load the filtrate back into the reactor and heat to 95° C. to strip ethanol under atmospheric conditions. Use a Dean-Stark trap to collect residual solvent. Heat the solution up to 130° C. with nitrogen sparging to complete solvent stripping. Allow the resulting resin to cool down and characterize viscosity, weight-average molecular weight and OZ content as Comp Ex B.

Comp Ex C—Sequential Acid then Base Gel-Type Heterogeneous Catalysts

Add into a batch kettle reactor 20 g dry (pre-swollen) mass of Gel-type Heterogeneous Acid Catalyst BD20 swollen with Solvent 2, 11.75 g of Solvent 2, 190.79 g of n-octyltriethoxysilane, 585 microliters of water, and then feed in 14.18 g of Water (fed in at a rate of 0.178 milliliters per minute) while mixing at 600 revolutions per minute (RPM) for 80 minutes at 70° C. under a nitrogen blanket atmosphere. During this time, hydrolysis and condensation reactions occur thereby producing ethanol as a byproduct. Upon completion of water addition, heat the reaction mixture to 77° C. and reflux for 4 hours and while refluxing add 358 microliters of water. Cool the reaction mixture down to 25° C. and filter using a Büchner funnel with Fisher Scientific P4 filter paper to remove the Gel-type Heterogeneous Acid Catalyst to get Filtrate 1.

Add 20.15 g dry (pre-swollen) mass of Gel-type Heterogeneous Base Catalyst 550A swollen with Solvent 2 and 11.71 g of Solvent 2, and 177 g of Filtrate 1 to the batch kettle reactor. While mixing at 600 RPM under a nitrogen blanket heat the mixture to 77° C. and reflux for 21 hours. Cool the solution down and stop mixing to get a two-phase composition. Use a Büchner funnel with Fisher Scientific P4 filter paper to filter the entire composition to remove solid catalyst. Load the filtrate back into the batch kettle reactor and heat to 95° C. to strip ethanol under atmospheric conditions. Use a Dean-Stark trap to collect residual solvent. Then heat to 130° C. to complete solvent stripping while sparging with nitrogen. Allow the resulting resin to cool down and characterize viscosity, weight-average molecular weight and OZ content as Comp Ex C.

Ex 1—Concurrent Acid and Base Gel-Type Heterogeneous Catalysts of Comp Ex C

Prepare a catalyst pre-mixture by combining and physically mixing 20 g dry (non-swollen) Gel-type Heterogeneous Acid Catalyst BD20 and 20 g dry (non-swollen) mass of Gel-type Heterogeneous Base Catalyst 550A. Swell the physical mixture with Solvent 2 to obtain the catalyst pre-mixture.

Add into a batch kettle reactor the catalyst pre-mixture, 11.69 g of Solvent 2, 192.13 g of n-octyltriethoxysilane, 585 microliters of water, and then feed in 14.18 g of Water (fed in at a rate of 0.178 milliliters per minute) while mixing at 1000 revolutions per minute (RPM) for 80 minutes at 70° C. under a nitrogen blanket atmosphere. During this time hydrolysis and condensation reactions occur producing ethanol byproduct. Once the water addition is complete, heat the resulting solution to 77° C. and reflux for 4 hours and then allow to cool down. Filtering the solution with a Büchner funnel with Fisher Scientific P4 filter paper is difficult so filter a small amount of the solution using a polytetrafluoroethylene 0.45 micrometer syringe filter. Strip the filtered solution to remove ethanol using a rotovap. Characterize viscosity, weight-average molecular weight and OZ content as Ex 1.

Ex 2—Concurrent Acid and Base Gel-Type Heterogeneous Catalysts

Add into a batch kettle reactor 50 g (dry mass) of Gel-type Heterogeneous Acid/Base Blend Catalyst that has been pre rinsed in water, dried under vacuum and then swollen with Solvent 2, 11.69 g Solvent 2, 190.41 g of n-octyltriethoxysilane, 585 microliters of water, and then feed in 14.18 g of Water (fed in at a rate of 0.178 milliliters per minute) while mixing at 600 revolutions per minute (RPM) for 80 minutes at 70° C. under a nitrogen blanket atmosphere. Throughout the water addition step, feed 20.39 g of additional Solvent 2. During this time hydrolysis and condensation reactions occur producing ethanol byproduct. Once the water addition is complete, heat the resulting solution to 77° C. and reflux for 4 hours while adding 341 microliters of water. Allow the resulting solution to cool. Filter the resulting solution with a Büchner funnel with Fisher Scientific P4 filter paper to remove the catalysts. Rinse the catalyst with toluene to extract the final product from the catalyst mixture. Strip the extracted solution to remove toluene using a rotovap to obtain Ex 2. Characterize viscosity, weight-average molecular weight and OZ content as Ex 2.

Viscosity

Determine viscosity of resins using a Brookfield Viscometer (model LVDV-II+P) and spindle SC4-18 with sample volume of 6.7 milliliters and at a temperature of 25° C. Select the spindle, load the sample cup, insert the cup into the small sample adapter. Connect the spindle to the instrument. Allow the sample to equilibrate to temperature for at least 10 minutes. Start the instrument motor and select a rotational speed that results in a torque range of 10-90% and run for three minutes. Collect data on the run and stop the motor. Allow the sample to stand for two minutes. Repeat two more times for a total of three runs. Use the average viscosity of the three runs as the sample viscosity. Report viscosity in milliPascals*seconds (mPa*s).

Weight-Average Molecular Weight (Mw)

Determine weight-average molecular weight for resin samples using gel permeation chromatography (GPC). Use an Agilent Chemstation method 3102 8B GPC 24-FEB-2012.M. Degass samples through a membrane. The pump is isocratic at one milliliter per minute at 6-7 MegaPascals pressure. Use an autosampler at 10° C. Use a 1×5 micrometer Guard (50 mm*7.5 mm) and 2×PL gel 5 micrometer Mixed C (300 mm*7.5 mm) (Fisher Part #50-010-6923) columns maintained at 35° C. Use a refractive index detector at 35° C. The detector has an automatic valve that sends materials during analysis to waste and recycles all other times. Tetrahydrofuran, stabilized with 250 weight-parts per million weight parts butylated hydroxy toluene (BHT) is the effluent for the system.

Prepare samples by adding 1000 microliters of HPLC grade toluene with 10 microliters sample to gel chromatography vials. Mix each sample using a vortex mixer. Calibrate with polystyrene standards analyzed from 580 to $1.8 \times 10^6$ Mp, where Mp refers to the molecular wight of the highest peak. A total of 10 polystyrene standards are analyzed in two injections. A logarithmic scale is used to provide $>0.999$ $r^2$.

OZ Content

Determine OZ content of a resin using silicon-29 ($^{29}$Si) nuclear magnetic resonance (NMR) spectroscopy. Collect NMR spectra using an Agilent 500 megahertz DD2 (mi-MR-06) system equipped with a 16 mm silicone free AutoX probe or on a Varian Inova NMR (mi-MR-04) spectrometer with a proton operational frequency of 400 megahertz.

Prepare samples in deuterated chloroform with 0.02 molar chromium (III) acetylacetonate (Cr(acac)$_3$).

The OZ content is the sum of the moles of alkoxyl and hydroxyl groups bound to silicon atoms stated as a percent relative to moles of silicon atoms in the molecule. Determine OZ content from the $^{29}$Si NMR spectrum of the molecule by identifying the peaks corresponding to the different siloxane units (M, D, and T) based on pre-determined assignments known in the art, integrating those peaks to determine relative molar concentrations of the functional groups. The OZ content is the sum of the products of molar concentration of each functional group multiplied by the number of OZ groups associate with each functional group.

TABLE 2

| Component or Resin Characteristic | Comp Ex A | Comp Ex B | Comp Ex C | Ex 1 | Ex 2 |
|---|---|---|---|---|---|
| Reaction Components | | | | | |
| Alkoxy Silane | 190.88 | 190.58 | 190.79 | 192.13 | 190.41 |
| Solvent 1 | 12.00 | 11.71 | 0 | 0 | 0 |
| Solvent 2 | 0 | 0 | 23.46 | 11.69 | 32.29 |
| Water | 14.18 | 15.12 | 15.12 | 14.77 | 15.11 |
| HCl Homogeneous Acid Catalyst | 2.06 | 0 | 0 | 0 | 0 |
| Homogeneous Base Catalyst KOH | 0.65 | 0 | 0 | 0 | 0 |
| CaCO3 Neutralizing Agent | 0.40 | 0 | 0 | 0 | 0 |
| Gel-type Heterogeneous Acid Catalyst BD20 | 0 | 0 | 20.00* | 20.00* | 0 |
| Macroporous-type Heterogeneous Acid Catalyst 17D | 0 | 17.64 | 0 | 0 | 0 |
| Gel-type Heterogeneous Base Catalyst 550A | 0 | 0 | 20.15* | 20.00* | 0 |
| Macroporous-type Heterogeneous Base Catalyst A26 | 0 | 19.73 | 0 | 0 | 0 |
| Gel-type Heterogeneous Acid/Base Blend Catalyst | 0 | 0 | 0 | 0 | 50* |
| Resin Characteristics | | | | | |
| Viscosity (mPa*s) | 172 | 43 | 176 | 953 | >38k |
| OZ Content (mol %) | 50 | 112 | 60 | 44 | 37 |
| Weight-Average Molecular Weight (g/mol) | 3236 | 1856 | 4002 | 7320 | 7012 |
| Reaction Time (hours) | 4 | 8 | 25 | 4 | 4 |

*Dry weight (non-solvent swollen weight)

Comp Ex A serves as a reference for a typical sequential homogeneous catalyzed process for producing polycondensation siloxane product. A desire is to achieve similar or better (equal or higher viscosity, equal or lower OZ content, and equal or higher Mw) as this reference using the same reaction time.

Comp Ex B illustrates that concurrent Macroporous Heterogeneous Acid and Base catalysts are unable to achieve the desired results of equal or higher viscosity, equal or lower OZ content, and equal or higher Mw relative to Comp Ex A even in double the reaction time of Comp Ex A.

Comp Ex C illustrates that sequential use of Acid then Base Gel-type Heterogeneous catalyst do not achieve the desired results of equal or higher viscosity, equal or lower OZ content, and equal or higher Mw relative to Comp Ex A even at 6-times the reaction time of the reference Comp Ex A.

Ex 1 uses the same composition as Comp Ex C except uses the catalysts concurrently throughout the entire process. Surprisingly, the process does achieve the desired results of equal or higher viscosity, equal or lower OZ content, and equal or higher Mw relative to Comp Ex A in the same reaction time.

Ex 2 is a repeat of Ex 1 except using different gel-type heterogeneous catalysts concurrently throughout the process. This process also surprisingly achieves the desired results of equal or higher viscosity, equal or lower OZ content, and equal or higher Mw relative to Comp Ex A in the same reaction time.

What is claimed is:

1. A process for preparing polysiloxanes, where the process comprises a two-part polycondensation of alkoxy silanes and/or alkoxy siloxanes the process comprising the following steps:
   (a) hydrolysis of the alkoxy silanes and/or alkoxy siloxanes to hydroxyl-functional silanes and/or hydroxyl-functional siloxanes; and
   (b) condensation of the hydroxyl-functional silanes and/or hydroxyl-functional siloxanes to form polysiloxane polycondensation product;

where the process is characterized by having both gel-type heterogeneous acid catalysts and gel-type heterogeneous base catalysts present concurrently during both the hydrolysis and condensation steps.

2. The process of claim 1, wherein the gel-type heterogeneous acid catalyst and gel-type heterogeneous base catalyst are each swollen in a polar solvent.

3. The process of claim 1, wherein the process is a polycondensation of alkoxy silanes.

4. The process of claim 3, wherein the alkoxy silanes have the general formula: (RO)$_x$R'$_{(4-x)}$Si; where subscript x is a value in a range of 1 to 4, each R and R' is independently in each occurrence selected form a group consisting of C1-C8 alkyl groups, substituted C1-C8 alkyl groups, aryl groups and substituted aryl groups.

5. The process of claim 1, wherein the polycondensation occurs either in a reaction vessel as a batch reaction or as a continuously flowing reaction through a fixed bed reaction column comprising a fixed bed comprising a physical mixture of the gel-type heterogeneous acid catalysts and gel-type heterogeneous base catalysts.

6. The process of claim 1, further comprising isolating the gel-type heterogeneous acid catalyst and gel-type heterogeneous base catalyst from reaction products after the reaction is complete.

7. The process of claim 6, wherein the process includes filtering and/or allowing the heterogeneous catalyst to settle and then decanting off the liquid supernatant and/or withdrawing off the settled catalysts from the liquid supernatant.

8. The process of claim 6, wherein the gel-type heterogeneous acid catalyst and gel-type heterogeneous base catalyst are reused in another process of the present invention after isolating and without replenishing the acid and/or base sites of the catalysts.

9. The process of claim 1, the process comprising the following steps:
  (a) providing a reaction mixture comprising:
    i. a solvent-swollen blend of gel-type heterogeneous acid catalyst and gel-type heterogeneous base catalyst as a catalyst blend;
    ii. a silane having the general formula: $(RO)_x R'_{(4-x)}Si$; where x is a value in a range of 1 to 4, each R and R' is independently in each occurrence selected form a group consisting of C1-C8 alkyl groups, substituted C1-C8 alkyl groups, aryl groups and substituted aryl groups; and
    iii. water;
  (b) mixing the reaction mixture, optionally while heating, to establish and maintain a slurry of components while allowing hydrolysis and condensation reactions to occur in the reaction mixture to form a product mixture; and
  (c) isolating the gel-type heterogeneous acid catalysts and gel-type heterogeneous base catalysts from the rest of the contents of the product mixture.

10. A composition comprising at the same time:
  (a) reactants selected from alkoxy silanes and/or alkoxy siloxanes, and/or siloxane polycondensation reaction products of alkoxy silanes and/or alkoxy siloxanes;
  (b) a gel-type heterogeneous acid catalyst;
  (c) a gel-type heterogeneous base catalyst; and
  (d) water.

\* \* \* \* \*